Feb. 17. 1925.

Re. 16,002

W. D. HARPER

VEHICLE BODY SUSPENSION

Original Filed June 20, 1919

Inventor:
William D. Harper by Wright, Brown, Quinby & Ray
Attys.

Reissued Feb. 17, 1925.

Re. 16,002

UNITED STATES PATENT OFFICE.

WILLIAM DAVID HARPER, OF NEWTON, MASSACHUSETTS.

VEHICLE BODY SUSPENSION.

Original No. 1,357,497, dated November 2, 1920, Serial No. 305,525, filed June 20, 1919. Application for reissue filed February 23, 1922. Serial No. 588,776.

*To all whom it may concern:*

Be it known that I, WILLIAM D. HARPER, a citizen of the United States, formerly a resident of San Antonio, in the county of Bexar and State of Texas, and now a resident of Newton, in the county of Middlesex and State of Massachusetts, have invented certain new and useful Improvements in Vehicle Body Suspensions, of which the following is a specification.

My invention relates to an automobile body suspension; and more particularly to a swing suspension for the bodies of motor trucks.

The object of my invention is to provide a body suspension for motor vehicles, particularly motor trucks, which will absorb and relieve the body and load of shocks sustained by the chassis frame.

A further object of my invention is to provide an automobile body suspension permitting of a relative limited swinging movement between the body of the vehicle and the chassis frame to absorb shocks sustained by the chassis frame.

A still further object of my invention is to provide an automobile body suspension comprising a swinging connection between the body proper and the chassis frame thereof for the absorption of shocks ordinarily transmitted to the body where the latter is bolted rigidly to the chassis frame, said suspension being simple in design and construction, efficient in operation, easily adjustable, and inexpensive to manufacture.

The invention comprises novel features of design, construction and arrangement of parts, the embodiment and application of which illustrated and described in the drawings, specifications and appended claims, is the form preferred for the purposes of illustration; but it should be understood that the invention is not limited to such form and that the details and application thereof may be varied without departing from the objects and scope of the invention.

Reference is to be had to the drawings, in which similar characters of reference indicate corresponding parts throughout the several views, and in which—

Figure 1:
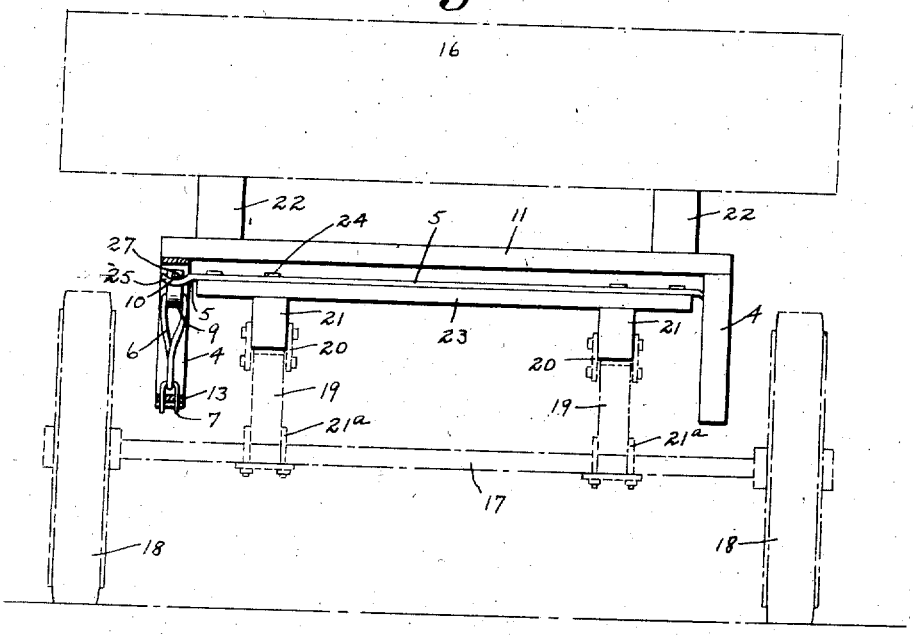
Figure 1 is an end view in elevation of my body suspension, in which the body of the vehicle, axle, springs and wheels are shown in diagrammatic outline.
Figure 2:
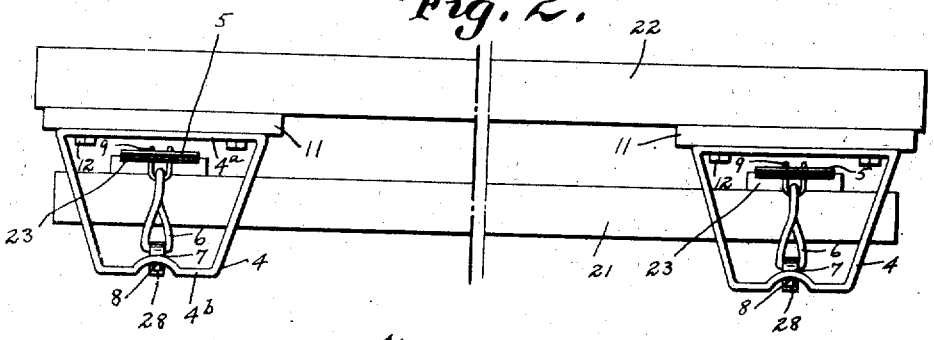
Figure 2 is a side view in elevation illustrating in detail the front and rear arrangement of the suspension, in this instance the suspension being four point, and particularly the method of connecting the body to the chassis frame.
Figure 3:
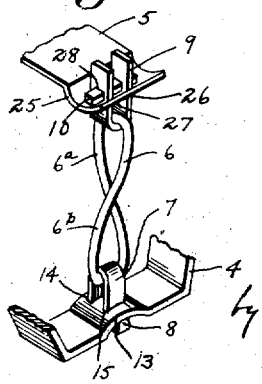
Figure 3 is a perspective view of the suspension illustrating the details of its construction.

Referring to Figure 1 of the drawings, illustrative of the preferred embodiment of my invention, an end view of a motor truck is shown in which the body 16, axle 17, wheels 18, springs 19, spring shackles 20 connecting the springs 19 to the chassis frame 21, and clamps 21ª fastening the same to the axle 17 are shown in dotted outline.

Interposed between the body 16 and the chassis frame 21 is the construction comprising the means by which these parts are connected to permit of a relative swinging movement between them in any direction.

This construction comprises body sills 22, consisting of girders or beams running longitudinally of the vehicle, to which the body 16 is secured, and which furnish the direct supporting means for the body. In turn, body sills 22 are supported by cross members or body supports 11, which may be positioned over the front and rear axles. Bolted to the chassis frame 21 are cross members or suspension bar supports 23, the longitudinal center lines of which are substantially in a perpendicular plane passing through the longitudinal center line of the body support 11 in each instance. Secured to the top of suspension bar supports 23, by means of bolts 24, are suspension bars 5, the channeled ends 25 of which, overlapping suspension bar supports 23, are provided with parallel slots 26 for the purpose hereinafter described. The channeled ends 25 of suspension bars 5 form the points from which the weight of the body 16 and the load therein contained is suspended and distributed on the chassis frame 21. Obviously the number of such suspension points may be reduced or multiplied by slight modification to suit special requirements. At each of the suspension points a swing connection is employed, the details of construction of which follow, and, as the swing connections at all suspension points are the same, it will suffice to explain the parts and adjustment of one such connection.

The swing connection comprises a bracket 4, preferably trapezoidal in form, bolted to cross member or body support 11 by means of bolts 12 through the base $4^a$ thereof. The center portion of base $4^b$ of bracket 4 is arched at 13 and provided with laterally disposed slots 14 and 15, through which the branches of stirrup 7 are inserted. Near the ends of the branches of stirrup 7 are slots 28 through which the rocker pin 8 is fitted, the latter being seated in the arched portion 13 of base $4^b$ and securing the stirrup which, normally, is in tension. Inserted through slots 26 and 27 in the channeled end 25 of suspension bar 5 is the stirrup 9, identical with the stirrup 7 above described, and it is secured in position by rocker pin 10, fitting through slots 28 near the ends of the branches of the stirrup, and seated in channel 25. It will be noted that stirrups 9 and 7 when adjusted in place are in a substantially right angular position with respect to each other. Connecting stirrups 9 and 7 is a twisted link 6, the loops $6^a$ and $6^b$ of which, linked with stirrups 9 and 7, respectively, are in planes approximately at right angles, corresponding to the angular relation of the stirrups.

For the purpose of convenient generic definition, the link 6, with its associated stirrups 7, 9 and pins 8, 10, may be aptly called a hanger; the channeled ends 25 of the suspension bars 5 may be called the hanger abutments of the chassis, or, more briefly, the chassis abutments since they are secured to the chassis and form, in effect, abutments on the latter from which the hangers depend; and for similar reasons the brackets 4, and particularly the arched portions 13 of the base members $4^b$ of such brackets, may be called the chassis abutments of the body, or, more briefly, simply body abutments. It will be noted that the suspension bars 5 are transversely positioned and that their ends (the chassis abutments above defined) project beyond the side bars of the chassis; while the bracket base portions $4^b$ (which provide the body abutments) are arranged longitudinally of the vehicle below the chassis abutments and support the body. Thus the body and the swinging connections are clear of the chassis construction and the latter opposes no obstacle to the swinging of the body laterally in any direction within limits sufficiently wide for the purpose in view.

The several parts of the hanger herein defined may be generically considered as comprising an intermediate member, namely, the link 6, and end members, namely, the stirrups 7 and 9, while the pins 8 and 10 may be considered as rocker bearing elements associated with and virtually forming parts of the stirrups or end members. The rocker bearing element so defined of the upper end member rests on the adjacent chassis abutment, whereby the upper end member is adapted to rock on this abutment. Similarly the rocker bearing element of the lower end member has a rocking engagement with the under side of the body abutment. Also the opposite extremities of the intermediate member or link have rocking engagement with the end members 7 and 9. As the latter rocking engagements are on lines respectively perpendicular or, more generically, transverse, to the lines on which the respectively adjacent end members rock on the adjacent abutments, each end of the hanger is coupled to the nearest abutment by what is, in effect, a rocking universal joint, whereby the hanger may be moved angularly in any direction in respect to each abutment. These rocking-movements, within the limits of ordinary operation, take place substantially without slip, and therefore without appreciable frictional resistance or wear.

The twisted form of the link causes the rocking lines at each end of the hanger to be transverse to the corresponding rocking lines at the opposite end. In other words the corresponding rocking lines of the two universal connections are respectively transverse to one another. To explain what is meant by "corresponding rocking lines" in the last statements, I would say that the line on which the pin 8 bears and rocks on the body abutment and the line on which the pin 10 bears and rocks on the chassis abutment correspond to one another in their characteristics and distance from the middle of the hanger, while the lines on which the opposite end parts of the link 6 bear and rock in the stirrups 7 and 9 correspond to one another in similar respects. In the embodiment here illustrated the bearing lines of the two pins are at right angles to each other and the bearing lines of the opposite ends of the link are also at right angles to each other; and the stirrups are equal to one another in length, or at least in the distance between the rocker pin and the part which engages the link. Thus in the transverse swing of the body the rocking action takes place at the bearing of the pin 10 on the chassis abutment and the bearing of the lower end of the link in the stirrup 7, the distance between these bearing points being the radius of swing; while in the longitudinal swinging motion the action takes place about the bearing of the upper end of link 6 in the stirrup 9 and the bearing engagement of pin 8 on the body abutment, the radius then being the distance between these two bearing lines. If the stirrups are of equal length as above stated, these two radii are equal, wherefore a given horizontal movement of the body in any direction results in approximately equal rise. While this is a valuable feature of the invention and is claimed as such, nevertheless it may be modified within the scope of other aspects of the invention and of my claim to protection therefor.

The necessary result of the characteristics thus described is that in the normal position of rest, i. e., that assumed when the wheel base of the vehicle is stationary, the body abutments are suspended vertically beneath the complemental chassis abutments and the vertical displacement of the body abutments from the chassis abutments is the maximum. When any swinging movement of the body from this position occurs, the body abutments travel in upwardly curved paths, of which the hangers are the radii, whereby all parts of the body are equally raised. Gravity proportional to the weight of the load opposes these movements, with progressively increasing force as the movements are wider and, therefore, the lift greater, until it balances whatever force is acting to cause displacement of the body. Then a condition of equilibrium is reached, without shock. When the displacing force ceases to act the normal position of rest is restored, also without shock.

The hanger thus described is the connecting means between the body 16 and the chassis frame 21 at each point of the suspension. As before indicated, the total number of suspension points may be varied as desired under different conditions, a common arrangement being four. At each suspension point the swing connection is provided, and the body, consequently, is free to swing in any direction to a limited degree, relative to the chassis frame. Whenever a rut or obstruction, or sudden stopping or starting of the vehicle, causes an abrupt change in speed of the chassis frame, the body, by virtue of its momentum or inertia, and the link connection, will swing oppositely to the direction in which the resultant of the forces then acting is applied to the chassis and will thus be relieved of the effect which would otherwise be produced were the body rigidly secured to the chassis frame.

It may be observed that the connections of the body-frame to the chassis frame constitute "lateral-lift" supports in that a combined lateral and lifting movement of the body is enforced under lateral displacing forces arising from the momentum or inertia of the body and its load; also that they are universal in their character in that limited lateral lifting movement of the body is permitted in all directions away from its normal position, and furthermore they are self restoring in that the weight of the body when laterally displaced tends to restore it to its normal position.

The term "chassis" is used in this specification to designate that part of the vehicle, however it may be constructed, which is carried by the road wheels; and the term "body" to designate the load-carrying part of the vehicle, however constructed, which is supported by the chassis.

The term "lateral" is herein employed to designate movements or forces which are either horizontal or transverse or compounded of longitudinal and transverse movements or forces.

What I claim and desire to secure by Letters Patent is:

1. The combination with a vehicle chassis, and a body above the same, of transversely positioned members supported on the chassis and projecting at their ends beyond the side bars of the chassis, abutment members located respectively below the outer ends of the first-mentioned members but connected to the body so as to support the same, and hangers supported on the first-mentioned members and supporting the last-mentioned members.

2. A vehicle comprising a chassis, a body, hanger abutments on said chassis and body, respectively, and hangers suspended by the chassis abutments and supporting the body abutments, the body being so supported above the chassis, said chassis abutments being extended laterally from the chassis frame, and the body abutments being below them and clear of the chassis frame, and the hangers being all of equal length.

3. In a vehicle, a chassis construction having a hanger abutment, a body also having a hanger abutment located below the first named abutment, and a pendant hanger supported by the chassis abutment and supporting the body abutment, said hanger having universal connection at its opposite ends with the respective abutments, whereby the body abutment is enabled to swing in any direction with respect to the chassis abutment.

4. A vehicle comprising a frame with supporting wheels and hanger abutments, a body also having hanger abutments arranged each below one of the chassis abutments, and hangers of equal length suspended from the several chassis abutments and supporting the subjacent body abutments, said hangers having universal connection with both of their associated abutments, whereby the body is enabled to swing in any direction, and is raised when swinging from the position of rest.

5. In a vehicle, the combination of a chassis construction having a hanger abutment, a body also having a hanger abutment disposed below the chassis hanger abutment, and a hanger having a rocking connection with each of said abutments on lines transverse to one another.

6. In a vehicle, a chassis construction having a hanger abutment, a body construction having a hanger abutment disposed below the chassis abutment, a hanger comprising a member at each end in rocking engagement with the respective abutments, and an intermediate member in rocking engagement at each of its ends with the aforesaid end members on lines respectively transverse to the lines of rocking engagement of the end members with the abutments.

7. In a vehicle, the combination of a chassis construction having a hanger abutment and a body construction also having a hanger abutment located below the chassis abutment and a hanger comprising end members having rocker bearing elements respectively engaged with and supported by the chassis abutment and engaging and supporting the body abutment, and an intermediate member having rocking engagement with said end members; the engagement of the intermediate member with the end members being on lines transverse to the rocking lines of the bearing elements on the abutments respectively.

8. A vehicle comprising road wheels, a chassis supported by said road wheels and having hanger abutments, a body having hanger abutments, and hangers supported by the chassis abutments and supporting the body abutments, said hangers including intermediate members and end members having rocking engagement with said intermediate members and with the adjacent abutment, and the several chassis and body abutments being so disposed that the engaging points of the hangers with the body abutments are vertically below the engaging points of the hangers with the chassis abutments, whereby all suspended points of the body are moved and raised when swinging from the position of rest.

9. A vehicle comprising a chassis having a hanger abutment, a body having a hanger abutment arranged below the chassis abutment, a hanger suspended from the chassis abutment and supporting the body abutment and having universal rocking connection at one end with the chassis abutment and at the opposite end with the body abutment, the rocking line on which the hanger engages one abutment being transverse to the line on which it engages the other abutment.

10. A vehicle comprising a chassis having a hanger abutment, a body having a hanger abutment arranged below the chassis abutment, a hanger suspended from the chassis abutment and supporting the body abutment and having universal rocking connections at each end with one of the abutments on lines transverse to each other, the corresponding rocking lines of the two universal connections being respectively transverse to one another.

11. A vehicle comprising a chassis having a hanger abutment, a body having a hanger abutment disposed below the chassis abutment, and a hanger comprising an end member having line rocking engagement with the chassis abutment, an opposite end member having line rocking engagement with the under side of the body abutment on a line perpendicular to the first line, and an intermediate member having rocking engagement with said end members on lines respectively perpendicular to each other, the distance between the bearing lines of each end member being the same.

12. A vehicle having a body construction and a chassis construction, said body construction being suspended and underslung from said chassis construction, and in longitudinally movable and swinging relation therewith, by suspension means of the class described, in combination with said vehicle, comprising a body member rigidly secured to the body construction, a chassis member rigidly secured to the chassis construction, and a flexible connection between said members, said flexible connection comprising a plurality of links, and pins for securing said links respectively to said body member and said chassis member.

13. The combination with a vehicle, having a body and a chassis frame, of a body suspension of the class described, comprising a suspension bar support, a suspension bar, means for securing said suspension bar to said suspension bar support, a body support, a bracket, means for securing said bracket to said body support, and means for connecting said bracket to said suspension bar including a plurality of links, and means for connecting the end links to said suspension bar and said bracket.

14. The combination with a vehicle, having a body and a chassis frame, of a body suspension of the class described, comprising a suspension bar support, a suspension bar, means for securing said suspension bar to said suspension bar support, a body support, a bracket, means for securing said bracket to said body support, means for connecting said bracket to said suspension bar, including a plurality of links, and means for connecting the end links to said suspension bar and said bracket, the point of connection between said links and said bracket being below the point of connection between said links and said suspension bar.

15. The combination with a vehicle, having a body and a chassis frame, of a body suspension of the class described, comprising a suspension bar support, a suspension bar, means for securing said suspension bar to said suspension bar support, a body support, a bracket, means for connecting said bracket to said body support, means for connecting said bracket to said suspension bar, including a plurality of links, slots in said suspension bar and in said bracket for the end links, slots in said end links, and pins fitting through said slots in said end links.

16. In a road vehicle, the combination with a unitary load carrying frame, of a unitary supporting frame through which the load carrying frame is adapted to be propelled, and means supporting the load carrying frame on the supporting frame, the same comprising a plurality of self restoring, universal, lateral-lift supports arranged to simultaneously lift all parts of the load carrying frame when laterally displaced relative to the supporting frame.

17. In a road vehicle, the combination with a rigid unitary load carrying frame, of a rigid unitary spring supported chassis frame, supporting wheels for the chassis frame, and supporting means allowing the weight of the load carrying frame to rest unyieldingly on the chassis frame, the same comprising a series of self restoring, universal, lateral-lift supports disposed between the two frames and arranged to simultaneously and equally lift all parts of the load carrying frame when laterally displaced relative to the chassis frame.

In testimony whereof I have affixed my signature.

WILLIAM DAVID HARPER.